(12) United States Patent
Delolme et al.

(10) Patent No.: US 9,792,592 B2
(45) Date of Patent: Oct. 17, 2017

(54) PORTABLE ELECTRONIC DEVICE FOR EXCHANGING VALUES AND METHOD OF USING SUCH A DEVICE

(75) Inventors: Pierrick Delolme, Paris (FR); Marc Bertin, La Celle les Bordes (FR)

(73) Assignee: OBERTHUR TECHNOLOGIES, Paris (FR)

( * ) Notice: Subject to any disclaimer, the term of this patent is extended or adjusted under 35 U.S.C. 154(b) by 927 days.

(21) Appl. No.: 12/256,018

(22) Filed: Oct. 22, 2008

(65) Prior Publication Data

US 2009/0106159 A1 Apr. 23, 2009

(30) Foreign Application Priority Data

Oct. 22, 2007 (FR) ...................................... 07 58476

(51) Int. Cl.
*G06Q 20/00* (2012.01)
*G06Q 20/10* (2012.01)
(Continued)

(52) U.S. Cl.
CPC ........... *G06Q 20/10* (2013.01); *G06Q 20/202* (2013.01); *G06Q 20/204* (2013.01);
(Continued)

(58) Field of Classification Search
CPC ....... G06Q 20/00; G06Q 20/10; G06Q 20/202
(Continued)

(56) References Cited

U.S. PATENT DOCUMENTS

| 2005/0065876 A1* | 3/2005 | Kumar | G06Q 20/10 |
| | | | 705/39 |
| 2005/0177517 A1* | 8/2005 | Leung | G06Q 20/20 |
| | | | 705/64 |

(Continued)

FOREIGN PATENT DOCUMENTS

| DE | 10 2004 046847 | 4/2006 | |
| EP | 1549006 A1 * | 6/2005 | ......... H04L 12/4633 |

(Continued)

OTHER PUBLICATIONS

WKIPEDIA. Near field communication. https://en.wikipedia.org/wiki/Near_field_communication. Retrieved online Jun. 21, 2017.*

(Continued)

*Primary Examiner* — James A Reagan
(74) *Attorney, Agent, or Firm* — Young & Thompson

(57) ABSTRACT

The invention concerns a portable electronic transfer device using a near-field wireless communication module and a method of using it. The device includes means for entering an amount and an acceptance command so that a debtor can enter their personal identification number on their portable device and not on that of a third party. If the acceptance command is authenticated, a secure message containing the amount is sent via the near-field. wireless communication module to a creditor. The creditor can then add their references to the message and send it to effect the transaction. Alternatively, the creditor sends their references to the debtor via the near-field wireless communication module and the debtor can formulate a transaction request including the amount and the references of the creditor.

25 Claims, 3 Drawing Sheets

(51) Int. Cl.
    *G06Q 20/20*     (2012.01)
    *G06Q 20/22*     (2012.01)
    *G06Q 20/32*     (2012.01)
    *G06Q 20/36*     (2012.01)
    *G06Q 20/40*     (2012.01)
    *H04L 29/08*     (2006.01)

(52) U.S. Cl.
    CPC ......... *G06Q 20/206* (2013.01); *G06Q 20/223* (2013.01); *G06Q 20/32* (2013.01); *G06Q 20/322* (2013.01); *G06Q 20/3227* (2013.01); *G06Q 20/3278* (2013.01); *G06Q 20/363* (2013.01); *G06Q 20/401* (2013.01); *G06Q 20/4012* (2013.01); *G06Q 20/4014* (2013.01); *H04L 67/12* (2013.01)

(58) Field of Classification Search
    USPC ........................................................ 705/67
    See application file for complete search history.

(56) References Cited

U.S. PATENT DOCUMENTS

2007/0011099 A1*   1/2007   Sheehan ..................... 705/65
2007/0123215 A1     5/2007   Wang
2007/0190939 A1*   8/2007   Abel .................. H04B 5/0031
                                                                                     455/41.2
2008/0270300 A1   10/2008   Jones et al.

FOREIGN PATENT DOCUMENTS

WO     2005079038     8/2005
WO     2007/076456     7/2007
WO     2007/119032     10/2007

OTHER PUBLICATIONS

International Search Report dated May 2, 2008, in French application.

* cited by examiner

PORTABLE ELECTRONIC DEVICE FOR EXCHANGING VALUES AND METHOD OF USING SUCH A DEVICE

TECHNICAL FIELD OF THE INVENTION

The present invention concerns the exchange of amounts in values, for example monetary values, loyalty points, purchase or subscription vouchers, and more particularly a portable electronic device, for example a mobile telephone, for exchanging values and a method of using such a device.

PRIOR ART

The evolution of communication networks, notably the Internet, has contributed to the development of new modes of distribution of goods and services which have themselves driven the use of new means of payment. For example, payment via a communication network, also known as online payment, enables a user, after ordering goods or services, to provide banking information, an amount and an authorization to a trusted third party in order for the latter to send a transaction request to the computer system of the banking establishment concerned.

However, although means of payment between different companies or between persons and companies have led to numerous developments, few systems enable simple and secure exchange of amounts in values between a number of persons.

There exist electronic purses enabling a debtor to pay a monetary sum to a creditor, the debtor and the creditor being physically close to each other at the time of the transaction. In these systems, a payment card is able to store a number representing a monetary amount. The card can be credited, or topped up, using an appropriate device. It is debited on each payment. This payment method does not generally employ an authentication mechanism for verifying the consent of the cardholder, being in many cases an anonymous method of payment, such as payment in cash. However, such payment means can be used only for small transactions. Moreover, to receive the money, the creditor must have a device adapted to read the card, by contact or without contact.

There are also systems, such as the system described in patent application WO 03/023574, enabling a debtor to pay a monetary sum to a creditor, the debtor and the creditor not necessarily being close to each other at the time of the transaction. In these systems, a monetary transfer can be effected between two persons who have electronic entities such as mobile telephones. Here the transactions are effected through a central system in which profiles of the users are stored. Such profiles store users' banking information and carry out the necessary checks. However, such solutions entail entering the identity of the creditor, which can be tiresome.

The invention solves one or more of the above problems.

OBJECT OF THE INVENTION

The invention therefore consists in a personal portable electronic device enabling a user to initiate transfer of a monetary or other amount, said device including near-field wireless communication means and:
  means for entering data linked to said monetary or other amount;
  means for entering a command to accept said transfer;
  means for authenticating said acceptance command and, means for sending a secure message including said data via said near-field wireless communication means.

The device of the invention enables a debtor, during a transaction, to enter the amount of the transaction and their personal identification number on their device and not on that of a third party, thereby limiting the risk of theft of the personal identification number.

The device advantageously further includes cryptographic means for encrypting at least part of said secure message to secure the transaction. In particular, the amount of the transaction cannot be modified independently of the wishes of the debtor.

In one particular embodiment, the device comprises storage means, preferably secure storage means, storing a reference of an account to be debited or a reference of said user, said reference being sent in said secure message to enable a debtor to avoid entering this information for each transaction.

The device preferably includes means for adding to said secure message authentication information enabling a recipient of said secure message, for example the creditor and/or a third party that is to effect the transaction, to authenticate said secure message. The authentication information can be different for the creditor and for the third party that is to effect the transaction. The debtor and/or said data can therefore be authenticated. The authentication information is a signature obtained by cryptographic means, for example.

Still in one particular embodiment, said means for authenticating said acceptance command include means for entering a personal identification number and means for comparing said personal identification number to a number stored beforehand. The device preferably includes secure internal storage means adapted to store said number recorded beforehand.

Said means for entering data linked to said monetary or other amount include a mechanical or touch-sensitive keypad, for example.

The invention also consists in a personal portable electronic device enabling a user to initiate transfer of a monetary or other amount, said device including near-field wireless communication means and:
  means for receiving via said near-field wireless communication means a reference of an account to be credited or a creditor;
  means for entering data relating to said monetary or other amount;
  means for entering a command to accept said transfer;
  means for authenticating said acceptance command; and
  means for creating and sending a transaction message including said data and said received reference.

The device of the invention enables a debtor, during a transaction, to enter their personal identification number on their device and not on that of a third party, thereby limiting the risk of theft of the personal identification number.

In one particular embodiment, said means for authenticating said acceptance command include means for entering a personal identification number and means for comparing said personal identification number to a number stored beforehand. The device preferably includes secure internal storage means for storing said number stored beforehand.

The invention further consists in a personal portable electronic device enabling of a user to proceed to transfer a monetary or other amount, said device including near-field wireless communication means and:

means for receiving a secure message including data linked to said monetary or other amount and being received via said near-field wireless communication means;

means for adding complementary information to said received secure message, said completed secure message forming at least part of a transaction message; and means for sending said transaction message.

The device of the invention enables a debtor, during a transaction, to enter the amount of the transaction and their personal identification number on their device and not that of a third party, thereby limiting the risk of theft of the personal identification number.

In one particular embodiment, the device further includes storage means for storing said complementary information to enable a creditor to avoid entering that information on each transaction. Said complementary information is advantageously a reference of an account to be credited or a reference of said creditor.

The device preferably further includes cryptographic means for authenticating said secure message in order to authenticate its source.

The device preferably includes means for adding authentication information to said secure message, said authentication information enabling a recipient of said secure message, for example a third party that is to effect the transaction, to authenticate said secure message. The debtor, the creditor and/or said data can thus be authenticated. The authentication information is a signature obtained by cryptographic means, for example. Said cryptographic means are advantageously adapted to encrypt said signed transaction message to secure the transaction.

Still in one particular embodiment, said means for sending said transaction message are adapted to defer sending said transaction message. Thus a transaction can be initiated an the absence of a connection to a mobile telephone network or to a data communication network.

The device advantageously further includes means for receiving a transaction confirmation message and means for storing a received transaction confirmation message.

In one particular embodiment, the device further includes means for storing a first number and means for subtracting or adding a second number, according to said data. Thus the transaction can be effected directly between portable electronic devices, without recourse to a computer system of a third party.

To make the transaction more secure, the device advantageously further includes means for setting up a secure communication channel between said near-field wireless communication means and equivalent means of another portable electronic device, to make the transaction secure.

In one particular embodiment, the device includes mobile telephone means data communication network access means for sending a transaction request to a computer system of a third party.

The device of the invention thus combines local exchange of information and exchange of information via a mobile telephone network or a data network, for example, to simplify a transaction and make it secure.

The device advantageously further includes means for indicating the status of said transaction. Thus the device of the invention in particular makes it possible to determine if the devices of the debtor and the creditor must be near each other.

Said near-field wireless communication means conform to the NFC standard, for example. They can be integrated into a microcircuit card.

Said monetary or other amount is, for example, a monetary value, a number of loyalty points, a purchase or subscription voucher, a number of gaming points, a number of telephone units or rights to reproduce digital recordings.

The invention further consists in mobile telephone including the device described above.

The invention further consists in a method for sending a monetary or other amount between a creditor and a debtor each having a personal portable electronic entity including near-field wireless communication means, this method including the following steps:

entry of data linked to said monetary or other amount;

entry of a personal identification number;

authentication of said personal identification number;

creation of a secure message including said data; and sending said secure message via said near-field wireless communication means.

The method of the invention enables a debtor, during a transaction, to enter the amount of the transaction and their personal identification number on their device and not on that of a third party, thereby limiting the risk of theft of the personal identification number.

In one particular embodiment, said step of authenticating said personal identification number includes a step of comparing said personal identification number to a number stored beforehand.

The method advantageously further includes a step of signing said secure message, enabling subsequent authentication thereof. Similarly, the method preferably includes a step of encrypting at least part of said secure message to protect it and to prevent it from being modified unknown to the debtor.

The method preferably further includes a step for adding a reference of an account to be debited or a reference of said debtor to said secure message to avoid the debtor having to enter those references during each transaction.

The method preferably includes a step for adding to said secure message authentication information enabling a recipient of said secure message, for example the creditor and/or a third party that is to effect the transaction, to authenticate said secure message. The authentication information can be different for the creditor and for the third party that is to effect the transaction. The debtor and/or said data can thus be authenticated. The authentication information is a signature, for example.

The invention further consists in a method for sending a monetary or other amount between a creditor and a debtor each having a personal portable electronic entity including near-field wireless communication means, this method including the following steps:

reception of a reference of an account to be credited or of a creditor via said near-field wireless communication means, entry of data linked to said monetary or other amount;

entry of a personal identification number;

authentication of said personal identification number; and creation and sending of a transaction message including said data and said received reference.

The method of the invention enables a debtor, during a transaction, to enter the amount of the transaction and their personal identification number on their device and not on that of a third party, thereby limiting the risk of theft of the personal identification number.

In one particular embodiment, said step of authenticating said personal identification number includes a step of comparing said personal identification number to a number stored beforehand.

The invention further consists in a method for sending a monetary or other amount between a creditor and a debtor each having a personal portable electronic entity including near-field wireless communication means, this method including the following steps:

reception of a secure message including data linked to said monetary or other amount via said near-field wireless communication means;

addition of complementary information to said received secure message, said completed secure message forming at least part of a transaction message; and sending said transaction message.

The method of the invention enables a debtor, during a transaction, to enter the amount of the transaction and their personal identification number on their device and not on that of a third party, thereby limiting the risk of theft of the personal identification number.

The method advantageously further includes a step of authenticating said secure message to authenticate its source.

In one particular embodiment, said complementary information includes a reference to an account to be credited or a reference of said creditor to avoid the creditor having to enter these references during each transaction.

Still in one particular embodiment, the method further includes a step for adding to said transaction message authentication information enabling a recipient of said transaction message, for example the third party that is to effect the transaction, to authenticate said transaction message. Said data, said debtor and/or said reference of an account to be credited or of a creditor can thus be identified. Said authentication information can be a signature, said transaction message being signed in the form of a transaction request, to enable subsequent authentication of the transaction request.

The method preferably further includes a step of encrypting at least part of said transaction message in transaction request form to make the transaction secure.

The method advantageously includes a step of setting up a secure communication channel between said near-field wireless communication means of said portable electronic entities to make the transaction secure.

Said personal identification number is preferably entered by said debtor on their portable electronic entity, to reduce the risk of theft of said personal identification number.

In one particular embodiment, said transaction message is sent via a mobile communication network or via a data communication network enabling a transaction request to be sent to a computer system of a third party.

The method of the invention therefore combines local exchange of information and exchange of information via mobile telephone network or data network, for example, to simplify a transaction and make it secure.

Still in one particular embodiment, the method further includes a step of adding or subtracting said data to, respectively from, a number stored beforehand. The transaction can thus be effected directly between portable electronic entities, without using a computer system of a third party.

The method advantageously includes a step of bringing said portable electronic entities close to each other to make the transaction secure by limiting the broadcasting of the information sent.

The method advantageously further includes a step for indicating the status of said transaction. Thus the method of the invention makes it possible, in particular, to determine if the portable electronic entities of the debtor and the creditor must be close to each other.

In one particular embodiment, said monetary or other amount is a monetary value, a number of loyalty points, a purchase or subscription voucher, a number of gaming points, a number of telephone units or rights to reproduce digital recordings.

Still in one particular embodiment, one or more of said portable electronic entities is a mobile telephone.

BRIEF DESCRIPTION OF THE DRAWINGS

Other advantages, objects and features of the present invention emerge from the following detailed description, given by way of non-limiting example, with reference to the appended drawings, in which:

FIGS. 2a and 2b, shows a first example of an algorithm for implementing the invention in order to transfer a monetary or other amount between a debtor and a creditor each having a portable electronic entity;

FIGS. 5a, 5b and 5c, shows a second embodiment of the invention for transferring a monetary or other amount between a debtor and a creditor each having a portable electronic entity.

DETAILED DESCRIPTION OF THE INVENTION

A debtor uses the invention to send a monetary or other amount to a creditor using electronic entities such as mobile telephones or microcircuit cards including display and input devices. Here the electronic entities have near-field wireless communication means, for example enabling communication at a maximum distance of one meter, fifty centimeters or twenty centimeters.

One or both of the two electronic entities also has communication means for transferring a transaction request to a computer system, typically a server, of a banking establishment, a trusted third party or a person responsible for managing the values concerned. Such communication means are telephone communication means, for example, in particular GSM (Global System For Mobile communications) or GPRS (General Packet Radio Service) telephone communication means. Alternatively, the communication means provide access to a data communication network to which the computer system of the banking establishment, the trusted third party or the person responsible for managing the values concerned is connected, to send the transaction request via the network. Such communication means are compatible with one or more of the WiFi standards, for example.

The amounts in values are monetary values, for example, loyalty points, purchase or subscription vouchers, gaming points, telephone units or rights to reproduce digital recordings (audio or audio and video).

Figure 1:
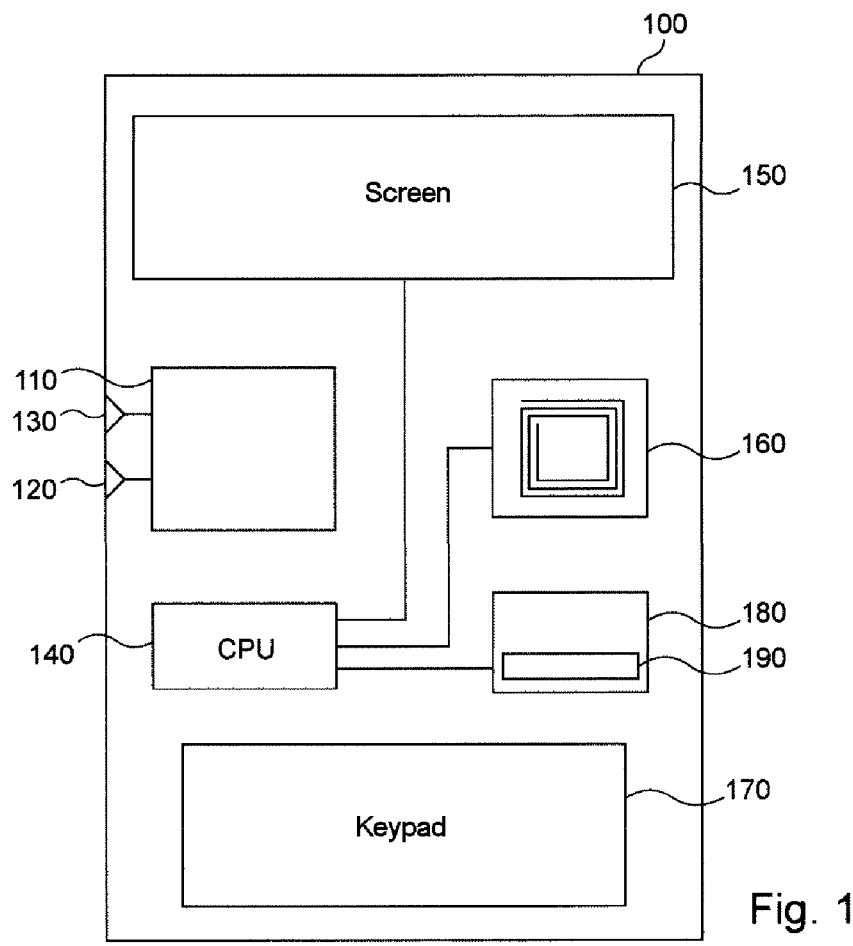
FIG. 1 is a diagram representing a portable electronic entity for implementing the invention.

FIG. 1 represents a portable electronic entity 100, here a mobile telephone, adapted to implement the invention. As shown, the mobile telephone 100 includes a mobile telephony module 110, advantageously connected to a loudspeaker 120 and to a microphone 130. The mobile telephone 100 also includes a Central Processing Unit (CPU) 140 and, preferably, a screen 150.

The mobile telephone 100 further includes a near-field communication module 160, advantageously a near-field wireless communication module. The module 160 is of the NFC (Near Field Communication) type, for example. The module 160 can be installed directly in the mobile telephone 100, for example in the form of an integrated circuit and antenna, or inserted in the mobile telephone 100, for example in the form of a microcircuit card including an integrated antenna.

The mobile telephone also includes an input device 170, such as a keypad or equivalent device, for entering characters, amounts in values and/or commands. In conjunction with the screen 150, the input device 170 forms a user interface. The input device 170 can equally be integrated in the screen 150 in the form of a touch-sensitive screen.

The mobile telephone 100 also includes a memory module 180 adapted to store an application 190 for exchanging amounts in values by means of the near-field wireless communication module 160 with another portable electronic entity that has a compatible communication module.

Figure 2:
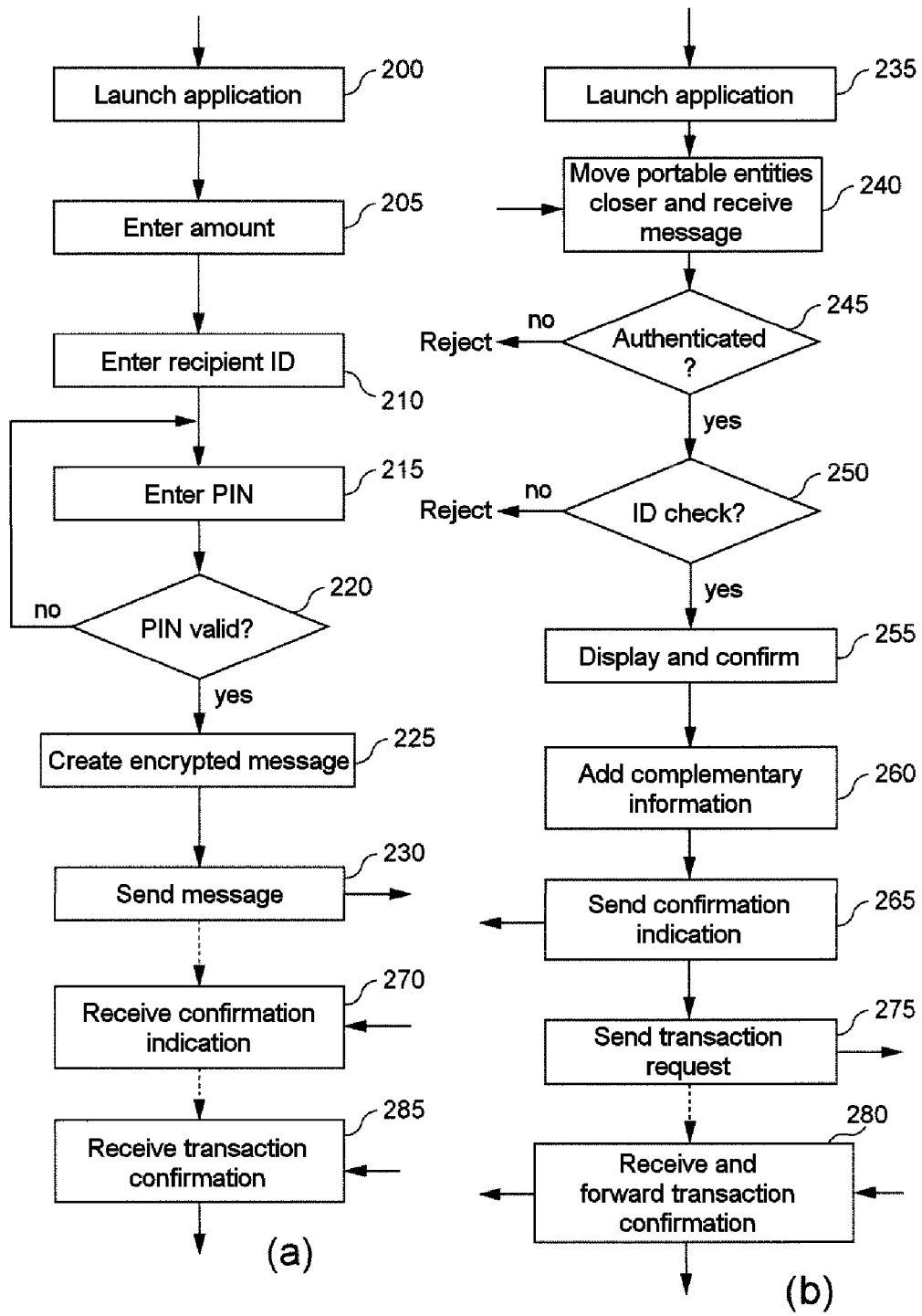
FIG. 2, comprising

FIG. 2, comprising FIGS. 2a and 2b, shows a first example of an algorithm for implementing the invention to send a monetary or other amount between two persons, a debtor and a creditor, each caving a portable electronic entity. The debtor is the person to whom the monetary or other amount is debited, for example the holder of an account that is debited, and the creditor is the person who receives the monetary or other amount, for example the holder of an account that is credited. The two portable electronic entities, which here are similar, are the mobile telephone shown in FIG. 1, for example. The debtor and the creditor therefore have respective mobile telephones 100 and 100'.

FIG. 2a represents the algorithm used in the portable electronic entity of the debtor and FIG. 2b represents the algorithm used in the portable electronic entity of the creditor. These algorithms are preferably partially integrated into a secure module (for authentication and addition of information enabling authentication) and partially in the same application, for example the applications 190 and 190', that can be used for debit and credit operations (user interface).

First of all, the debtor must launch the application for transferring a monetary or other amount (step 200). This application is the application 190 shown in FIG. 1, for example. The user can then enter a monetary or other amount (step 205) using the input device 170. This amount can be displayed on the screen 150 before it is confirmed.

When the user has confirmed this amount, they can be prompted to enter an identifier of the creditor (step 210), in particular if a secure communication channel has not been set up between the portable electronic entities of the debtor and the creditor. The identifier of the creditor is preferably short, such as their initials. It can be represented on six bytes, for example. Once again, the identifier of the creditor can be displayed before it is confirmed. This identifier is spoken by the creditor, for example.

The user is then prompted to enter an indication enabling their authentication, such as a Personal Identification Number or PIN (step 215). This code is preferably not displayed or is advantageously at least partially masked so that it cannot be viewed by a malicious person.

When the personal identification number has been confirmed, by the user or automatically if it conforms to predetermined rules, a test is effected to authenticate the user (step 220). For this purpose, the personal identification number can be sent to an authentication module which can be installed in the near-field wireless communication module 160, for example. The authentication module compares the code entered by the user with a code stored beforehand. If the personal identification number entered by the user does not match the number stored beforehand, the user is prompted to enter the personal identification number again. The number of attempts to enter the personal identification can be limited, for example to three attempts. Alternatively, or in addition to this, a pause time can be introduced between each attempt and the next, the pause time increasing on each attempt.

If the personal identification number is correct, the authentication module sends the application 190 an acknowledgement enabling the transfer of a monetary or other amount. The application 190 preferably displays an authentication indication on the screen 150 to advise that the transaction can be effected.

Figure 3:
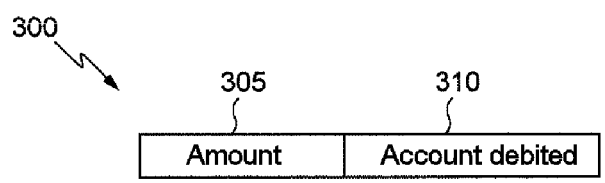
FIG. 3 shows an example of part of a message that can be sent by the portable electronic entity of the debtor to that of the creditor during the transaction, before it is encrypted.

A message is created (step 225). The message includes the monetary or other amount entered by the user. The message advantageously also includes indications relating to the identification of the debtor and/or of the account to be debited. FIG. 3 shows an example of the information contained in such messages, which can be created by the application 190.

It should be noted here that the message can also include an indication relating to the identity of the creditor, such as their initials. However, in one advantageous embodiment, the transaction is preceded by an exchange of preliminary information between the two portable electronic entities via the near-field wireless communication interface in order to set up a secure communication channel. It is therefore not necessary here to insert an indication relating to the recipient into the message. This exchange of preliminary information is also used to send one or more temporary cryptographic keys used to encrypt and decrypt the data exchanged.

The communication link set up between the portable electronic entities is preferably made secure by means of a security module including cryptographic means known to the person skilled in the art, typically means for encrypting, decrypting, signing and verifying a signature and means for storing one or more cryptographic keys.

As indicated hereinabove, a secure communication channel is preferably set up between the two portable electronic entities. Communication via the near-field wireless communication interface being then made secure by the use of temporary keys, it is not always necessary specifically to encrypt the message using another key.

Alternatively, at least part of the message is preferably encrypted and/or signed. For example, the indication relating to the creditor can be encrypted and signed to enable the creditor to authenticate the message whereas the information relating to the amount and to the account number of the debtor can be encrypted and signed to enable the server responsible for effecting the transaction to authenticate the message to verify that it was submitted by the debtor. In this case, two different keys can be used.

A security module containing cryptographic means for encrypting, decrypting, signing and verifying a signature can be installed in the near-field wireless communication module 160, for example. The security module preferably includes a secure microcontroller certified under the common criteria or in conformance with the requirements of the FIPS (Federal Information Processing Standards). This module is used to encrypt and decrypt all data in transit on the secure communication channel or, more specifically, the message. The message is then sent to the near-field wireless communication module 160 where it is encrypted. The encryption means are based on standard algorithms, for example, such as the DES (Data Encryption Standard), AES (Advanced Encryption Standard) and RSA (Rivest, Shamir and Adleman) algorithms, and a stored key. The security module can equally be installed elsewhere, for example in an SIM (Subscriber Identity Module) card inserted into the portable electronic entity or in the application 190.

Naturally there are other systems for making the transaction secure and authenticating the author of the message.

The encrypted message is then sent to the creditor (step 230) by the near-field wireless communication module 160.

If the portable electronic entities of the debtor and the creditor are not close to each other, they must be moved close to each other, for example to a distance less than 20 centimeters or 50 centimeters. The minimum relative distance between the portable electronic entities is determined by the range of the near-field wireless communication means. This step of moving the portable electronic entities closer contributes to the security of the system by limiting the risk of the information exchanged being intercepted and used by a third party.

Following agreement with the debtor, the creditor launches the application 190' for transferring a monetary or other amount (step 235). Alternatively, the application 190' can be launched automatically after reception of the message, if the received message has been identified as a transaction message.

When the portable electronic entity 100 of the creditor receives the encrypted message sent by the debtor (step 240) using its near-field wireless communication module 160', an authentication step (step 245) is executed. This purpose of this authentication step, based for example on the use of a public key, is to check the source of the received message. Authentication is preferably effected by a security module installed in the module 160, for example.

If the message is not authenticate, it is rejected.

If the message is authenticated and is not received via a secure communication channel, a test is effected to determine if the user of the portable electronic entity 100' is the recipient of the transfer (step 250), i.e. if the user of this portable electronic entity is the creditor. To this end, the indications relating to the identity of the creditor contained in the received message are compared to the indications relating to the identity of the creditor stored beforehand in the portable electronic entity 100', for example in the security module that can be installed in the near-field wireless communication module 160'. This test makes the transfer secure and reduces the already low risk (the communication range is limited) that the message will be intercepted by another portable electronic entity.

If the user is not the recipient of the transfer, the message is rejected.

If the user is the recipient of the transfer, the received message is transferred to the application 190'. If part of the message is confidential, preferably only the non-confidential part is sent to the application 190', which is not necessarily secure. Some information contained in the message is then preferably displayed on the screen 150' to enable the creditor to validate the transaction (step 255). The information displayed is the amount, for example, and indications relating to the identity of the debtor.

Figure 4:
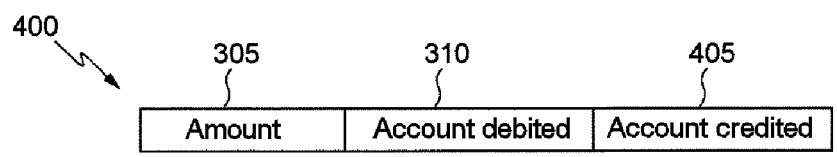
FIG. 4 shows an example of part of a message sent by the portable electronic entity of the creditor to that of the debtor when the creditor has confirmed the transaction or of part of a message sent to a computer system of a banking establishment, a trusted third party or a person responsible for managing the values concerned, in transaction request form.

The user can use the input device 170' to confirm the transaction or not. If the user does not confirm the transaction, the message is rejected. On the other hand, if the user confirms the transaction, complementary information is added to the message received (step 260). As shown in FIG. 4, this complementary information consists of data relating to the identity of the creditor and to the account to be credited, for example. This complementary information, which is preferably encrypted in the message, can be added by the security module at the request of the application 190'. This request to add the complementary information is therefore preferably sent with a confirmation indication to the module 160' including, for example, the security module. The near-field wireless communication module 160' in turn sends (step 265) a confirmation indication to the near-field wireless communication module 160 of the portable electronic entity of the debtor. The confirmation indication sent from the portable electronic entity of the creditor to that of the debtor advantageously includes the complementary information added to the message.

The confirmation indication received by the near-field wireless communication module 160 of the portable electronic entity of the debtor can be stored by that module or in the storage module 180 (step 270). The confirmation indication can be displayed on the screen 150.

A transaction request is then sent by the portable electronic entity of the creditor to the computer system of the banking establishment, the trusted third party or the person responsible for managing the values concerned (step 275). Here this request is sent via the mobile telephone network.

The transaction request can include information for authenticating the request, in particular authentication information added by the modules 160 and/or 160' using cryptographic keys stored in these modules (these cryptographic keys are different from the temporary keys used to secure the call between the two portable electronic entities). The transaction request is therefore advantageously similar to the confirmation indication sent from the portable electronic entity of the creditor to that of the debtor, possibly encrypted using a different key, enabling authentication by a trusted third party.

Alternatively, the transaction request can be sent by the portable electronic entity of the debtor taking account of the complementary information received with the confirmation indication.

The transaction request can equally be sent via a data communication network such as the Internet.

If the transaction request is not rejected by the computer system of the banking establishment, the trusted third party or the person responsible for managing the values concerned, for example if there is not sufficient credit on the account, the transaction is effected, in the standard way, by the computer system of the banking establishment, the trusted third party or the person responsible for managing the values concerned. A transaction confirmation message is preferably sent to the portable electronic entities of the debtor and the creditor when the transaction has been effected (steps 280 and 285) or preferably only to the portable electronic entity of the sender of the transaction request. In this case, the portable electronic entity of the sender of the transaction request advantageously sends the other portable electronic entity the transaction confirmation or rejection message.

Transaction confirmations are stored in each portable electronic entity, preferably in a nonvolatile memory, for archival storage purposes.

Alternatively, the transaction can be initiated by the creditor sending a message containing the references of the account to be credited to the debtor, the latter sending a message confirming the transaction to the debtor, possibly with complementary information concerning them. One such embodiment is described with reference to FIG. 5.

It should be noted here that the near-field wireless communication module 160 can take the form of a microcircuit card. This module is an electronic purse, for example. Alternatively, near-field wireless communication module 160 can be integrated into the central processing unit 140, then forming a single integrated circuit. It can equally consist of an integrated circuit, either comprising the antenna or not, mounted in the body of the portable electronic entity. The antenna can be integrated into the circuit or into another component of the portable electronic entity.

Moreover, the connection to the computer system of the banking establishment, the trusted third party or the person responsible for managing the values concerned and the communication of the transaction request can be effected during the transaction or later. This communication is preferably secure. In particular, the transaction request received by the computer system of the banking establishment, the trusted third party or the person responsible for managing the values concerned is advantageously authenticated.

If the values are stored and updated directly in the portable electronic entities, it is not necessary to effect a connection to a computer system of the banking establishment, the trusted third party or the person responsible for managing the values concerned. For example, if the near-field wireless communication modules 160 and 160' are electronic purses and the applications 190 and 190' have functions for reducing and increasing the stored values, setting up a connection is not required. Similarly, if the values concerned are loyalty points, if they are stored. directly in the portable electronic entities, and if the security modules, or alternatively the applications 190 and 190', have functions for reducing and increasing the stored values, it is not necessary to set up a connection.

FIG. 3 shows an example of part of a message that can be sent by the portable electronic entity of the debtor to that of the creditor during the transaction before it is encrypted (steps 225 and 230 in FIG. 2). As shown, the message 300 here includes a first field 305 corresponding to the amount of the transaction and a second field 310 corresponding to the reference of the account to be debited or to an identifier of the debtor enabling those references to be retrieved. The message 300 can equally include a third field corresponding to the identifier of the creditor, for example their initials. The second field 310 is naturally not necessary if the values are stored directly in the portable electronic entity of the debtor, i.e. if the message 400 is not necessarily sent to a server of a third party to effect the transaction. As indicated above, the message 300 is preferably encrypted before it is sent. Some data of the message is not shown in FIG. 3, such as the signature and the keys.

FIG. 4 shows one example of part of a message sent by the portable electronic entity of the creditor to that of the debtor when the creditor has confirmed the transaction (step 265 in FIG. 2) or part of a message sent to a computer system of a banking establishment, a trusted third party or a person responsible for managing the values concerned, in transaction request form.

As shown, the message 400 includes the fields 305 and 310 described above, relating to the amount of the transaction and to the account to be debited or the identification of the debtor. The message 400 further includes a field 405 corresponding to the reference of the account to be credited or to indications relating to the creditor enabling that reference to be retrieved. As indicated above, the second field 310 and/or the third field 405 are not necessary if the values are stored directly in the portable electronic entity of the debtor and/or the creditor, i.e. if the message 400 is not necessarily sent to a server of a third party to effect the transaction. Some data of the message is not shown in FIG. 4, such as the signature and the keys. The message 400 is preferably encrypted before it is sent.

It should be noted that although the creditor can read the message 300 and add information relating to the account to be credited, the creditor cannot modify the fields 305 and 310 concerning the amount of the transaction and the references of the account to be debited because of the security features used.

Figure 5:
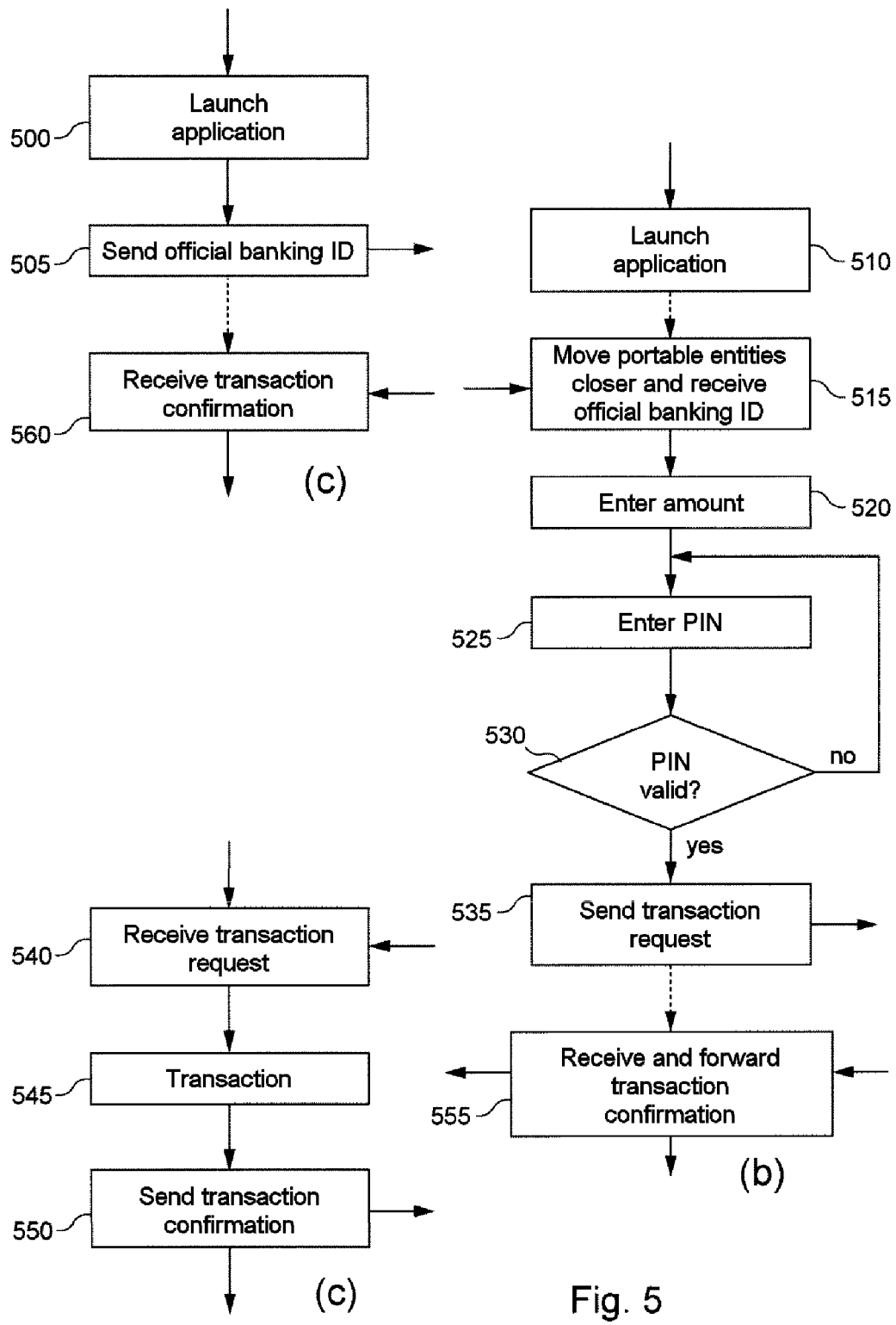
FIG. 5, comprising

FIG. 5, comprising FIGS. 5*a*, 5*b* and 5*c*, shows a second embodiment of the invention for transferring a monetary or other amount between a debtor and a creditor each having a portable electronic entity. Those portable electronic entities, which are similar here, are the device shown in FIG. 1, for example. The debtor and the creditor therefore have respective mobile telephones 100 and 100.

FIG. 5*a* represents the algorithm used in the portable electronic entity of the creditor, FIG. 5*b* represents the algorithm used in the portable electronic entity of the debtor, and FIG. 5*c* represents the algorithm used by the computer system of the banking establishment, the trusted third party or the person responsible for managing the values concerned. The algorithms of FIGS. 5*a* and 5*b* are preferably partially integrated into a secure module (authentication and addition of information enabling authentication) and partially in the same application, for example the applications 190 and 190', usable for debit and credit operations (user interface).

After launching the value transfer application 190' (step 500), the creditor selects and activates a function for sending an official banking ID or similar information giving the recipient the information for effecting the transfer of values. An official banking ID contains a finance establishment identification and a bank account number. Similar information for managing loyalty points could be a merchant name and a customer number, for example.

The function that sends the official banking ID is preferably selected using the input device 170' and the screen 150'.

If the official banking ID is not stored in the near-field wireless communication module 160', the application 190' sends it to it. The module 160' of the portable electronic entity 100' of the creditor then sends the official banking ID to the module 160 of the portable electronic entity 100 of the debtor (step 505).

With the agreement of the creditor, the debtor launches the application 190 for transferring a monetary or other amount (step 510) to receive the official banking ID (step 515). If the portable electronic entities 100 and 100' are not close to each other, they must be moved close to each other, for example at a distance less than 20 centimeters or 50 centimeters. The minimum relative distance between the portable electronic entities is determined by the range of the near-field wireless communication means.

The official banking ID can be sent via a secure communication channel previously set up between the portable electronic entities.

When the module 160 of the portable electronic entity 100 of the debtor receives the official banking ID, it forwards it to the application 190, which displays a screen for entering a monetary or other amount on the screen 150 (step 520).

After entering and confirming the monetary or other amount of the transfer, the user is prompted to enter their personal identification number (step 525). The personal identification number is preferably entered using the input device 170. It is preferably not displayed on the screen 150.

A test is then effected to determine if the personal identification number is correct (step 530). For this purpose, the personal identification number can be sent to a security module including cryptographic means that can be installed in the near-field wireless communication module 160, for example. The security module compares the number entered by the user with a number stored beforehand. If the personal identification number entered by the user does not match the number stored beforehand, the user is prompted to enter the personal identification number again. As indicated above, the number of attempts to enter the personal identification number can be limited, for example to three attempts. Alternatively, or in addition to this, a pause time can be introduced between each attempt and the next, the pause time increasing between each attempt and the next.

If the personal identification number is correct, the security module sends an acknowledgement to the application 190 authorizing the transfer. An acceptance indication is preferably displayed on the screen 150 to advise that the transaction can be effected.

A transaction request is then prepared by the application 190 and then sent (step 535) to the computer system of the banking establishment, the trusted third party or the person responsible for managing the values concerned. That request preferably includes the amount of the transaction and information as to the references of the accounts to be debited and credited. The references of the account to be credited are the official banking ID, for example. The references of the account to be debited are preferably stored in the module 160. The transaction request is similar to the message 400 described above. It is advantageously secure and sent via the mobile telephone network. The secure request preferably includes information for authenticating it. The request is made secure by the security module, which is advantageously installed in the module 160, which stores the necessary keys.

The transaction request can be sent at the time of the transaction or later.

The references of the banking establishment, the trusted third party or the person responsible for managing the values concerned are preferably stored in the portable electronic entity 100. The debtor can, however, modify them or enter them at the time of the transaction.

When the transaction request is received (step 540) by the computer system of the banking establishment, the trusted third party or the person responsible for managing the values concerned, the recipient authenticates the transaction request. If the transaction request is not authenticated, it is rejected. Similarly, if the transaction cannot be effected, for example if there is not sufficient credit on the account of the debtor, the transaction request is rejected. If the transaction request is not rejected, the monetary or other amount is transferred (step 545) in the standard way (a debit instruction is sent to the system managing the debtor account and a corresponding credit instruction is sent to the system managing the creditor account). A transaction confirmation or rejection message is then advantageously sent by the computer system of the banking establishment, the trusted third party or the person responsible for managing the values concerned (step 550) to the portable electronic entities of the debtor and the creditor when the transaction has been effected or rejected or, preferably, only to the portable electronic entity of the sender of the transaction request. In this case, the portable electronic entity of the sender of the transaction request advantageously sends the transaction confirmation or rejection message to the other portable electronic entity.

The transaction confirmations are advantageously stored in each portable electronic entity, preferably in the security modules.

On reception of the confirmation or rejection (steps 555 and 560), an indication is displayed on the screen 150, or on the screens 150 and 150', to show that the transaction has been effected or rejected.

The confirmation message can take the form of an SMS (Short Message Service) message, the telephone numbers of the debtor and the creditor being sent with the transaction request or stored by the computer system of the banking establishment, the trusted third party or the person responsible for managing the values concerned in relation with the references of the accounts to be debited and credited.

Although the agreement of the debtor can be confirmed by entering a personal identification number and comparing the number entered with a number stored beforehand, that agreement can be confirmed using other techniques. In particular, the agreement of the debtor can be confirmed by biometric means such as fingerprint comparison. In this case, the portable electronic entity of the debtor must have means for entering this information, for example a fingerprint reader.

If an exchange of data between the portable electronic entities is used to proceed to the transaction, the portable electronic entity of the creditor and/or that of the debtor advantageously include(s) means for indicating to the user that a transaction is in progress and/or has finished.

For example, one portable electronic entity produces a first audible signal when a first message is sent and a second audible signal, preferably different from the first, when a second message following on from the first is received. Alternatively, or in addition to this, a visual transaction indication can be displayed on the screen of the portable electronic entity to show that the transaction is in progress or has finished.

Naturally, to satisfy specific requirements, a person competent in the field of the invention can make modifications to the above description.

The invention claimed is:

1. A personal portable electronic device enabling a debtor to initiate transfer of one of a monetary and an other amount, said device comprising:
   a near-field wireless communication module configured to communicate at a maximum distance of one meter, the near-field wireless communication module comprising an integrated circuit and an antenna, the near-field wireless communication module conforming to a Near Field Communication (NFC) standard; and
   a central processing unit in operational communication with the near-field wireless communication module, the central processing unit being configured to initiate an initial transaction request and send a corresponding message to a personal portable electronic device of a creditor, the initiating and sending comprising:
      receiving, via an input device in operational communication with the central processing unit, data linked to one of said monetary and said other amount;

receiving a command to accept said transfer;
authenticating said acceptance command; and
upon said authenticating of said acceptance command being successful, sending securely the corresponding message, including said data, directly to the personal portable electronic device of said creditor of said transfer via said near-field wireless communication module, so as to carry out the transfer of the one of said monetary and said other amount.

2. The device according to claim 1, further comprising:
a secure storage memory configured for storing one of a reference of an account to be debited and a reference of said user, said reference being sent in said secure message, wherein:
   a minimum relative distance between the portable electronic devices is determined by a range of the near-field wireless communication module, and
   the minimum relative distance is less than 20 centimeters to limit a risk of information being intercepted and used by a third party.

3. The device according to claim 1, wherein the central processing unit is further configured to:
   add, to said secure message, authentication information that enables a recipient of said secure message to authenticate at least one of said secure message, said debtor and said data.

4. The device according to claim 3, wherein said adding of said authentication information to said secure message adds, to said secure message, second authentication information that enables a second recipient of said secure message, different from said recipient of said secure message, to authenticate said secure message.

5. The device according to claim 1, further comprising:
a secure internal storage memory configured for storing a number stored beforehand,
wherein said authenticating of said acceptance command includes receiving a personal identification number and comparing said personal identification number to said number stored beforehand.

6. The device according to claim 1, wherein the initiating of the initial transaction request begins prior to the personal portable electronic device of the debtor connecting wirelessly via the near-field wireless communication module to the personal portable electronic device of the creditor.

7. The device according to claim 1, wherein the data linked to one of said monetary and said other amount are unknown to the creditor prior to the personal portable electronic device of the debtor connecting wirelessly via the near-field wireless communication module to the personal portable electronic device of the creditor.

8. The device according to claim 1, wherein the personal portable electronic device of said creditor and the personal portable electronic device of said debtor operationally communicate directly with each other free of any interposed third device.

9. A personal portable electronic device enabling a debtor to initiate a transfer of one of a monetary and an other amount, said device comprising:
   a near-field wireless communication module configured to communicate at a maximum distance of one meter, the near-field wireless communication module comprising an integrated circuit and an antenna, the near-field wireless communication module conforming to a Near Field Communication (NFC) standard; and
   a central processing unit in operational communication with the near-field wireless communication module, the central processing unit being configured to initiate an initial transaction request and send a corresponding message to a personal portable electronic device of a creditor, the initiating and sending comprising:
      receiving, via said near-field wireless communication module, a reference of one of an account to be credited and said creditor;
      receiving data relating to one of said monetary and other amount;
      receiving a command to accept said transfer;
      authenticating said acceptance command; and
      upon said authenticating of said acceptance command being successful, sending securely the corresponding message, including said data and said received reference, directly to the personal portable electronic device of said creditor of said transfer via said near-field wireless communication module, so as to carry out the transfer of the one of said monetary and said other amount.

10. The device according to claim 9, further comprising:
a secure internal storage memory configured for storing a number stored beforehand, said authenticating said acceptance command including entering a personal identification number and comparing said personal identification number to said number stored beforehand, wherein:
   a minimum relative distance between the portable electronic devices is determined by a range of the near-field wireless communication module, and
   the minimum relative distance is less than 20 centimeters to limit a risk of information being intercepted and used by a third party.

11. The device according to claim 9, wherein the central processing unit is further configured for carrying out:
   adding to said transaction message authentication information enabling a recipient of said transaction message to authenticate at least one of said transaction message, said data, said debtor and said reference of one of an account to be credited and a creditor.

12. The device according to claim 9, wherein the one of said monetary and said other amount is one selected from the group consisting of a monetary value, a number of loyalty points, a purchase voucher, subscription voucher, a number of gaming points, a number of telephone units, and rights to reproduce digital recordings.

13. A personal portable electronic entity for enabling a creditor to proceed to transfer one of a monetary and an other amount, said device comprising:
   a near-field wireless communication module configured to communicate at a maximum distance of one meter, the near-field wireless communication module comprising an integrated circuit and an antenna, the near-field wireless communication module conforming to a Near Field Communication (NFC) standard; and
   a central processing unit in operational communication with the near-field wireless communication module, the central processing unit being configured to
      receive, from a personal portable electronic entity of a debtor, an initial request in the form of a secure message including data linked to one of said monetary and an other amount, said initial request being received directly via said near-field wireless communication module,
      add complementary information to said received secure message, a completed secure message forming at least part of a transaction message, and send said transaction message, so as to carry out the transfer of one of said monetary and said other amount.

14. The device according to claim 13,
wherein said complementary information is a reference of one of an account to be credited and a reference of said creditor,
wherein a minimum relative distance between the portable electronic devices is determined by a range of the near-field wireless communication module, and
wherein the minimum relative distance is less than 20 centimeters to limit a risk of information being intercepted and used by a third party.

15. The device according to claim 13, further comprising:
a cryptographic module configured to authenticate said secure message.

16. The device according to claim 13, wherein the central processing unit is further configured to receive a transaction confirmation message.

17. The device according to claim 13, wherein the central processing unit is further configured to add, to said transaction message, authentication information that enables a recipient of said transaction message to authenticate at least one of said transaction message, said data, said debtor, and said reference of one of an account to be credited and a creditor.

18. A transaction message system that performs safe transaction message transmissions between a debtor and a creditor, comprising:
a first personal portable electronic device utilized by the debtor, and a second personal portable electronic device utilized by the creditor,
each of the first and the second personal portable electronic devices comprising a near-field wireless communication module conforming to a Near Field Communication (NFC), an integrated circuit, and an antenna so as to communicate at a maximum distance of one meter,
wherein:
at least one of the first and the second personal portable electronic devices is configured to initiate transfer of one of a monetary and an other amount, and comprises a central processing unit configured to, in operation via the near-field wireless communication module, initiate an initial transaction request and send a corresponding transaction message to the other of the first and the second personal portable electronic devices, said corresponding transaction message comprising data linked to the one of said monetary and said other amount
the corresponding transaction message being transmitted directly between the first and the second personal portable electronic devices via the near-field wireless communication modules of the first and the second personal portable electronic devices, so as to carry out the transfer of one of said monetary and said other amount.

19. The transaction message system according to claim 18,
wherein the first personal portable electronic device is configured to allow the debtor to initiate transfer of one of a monetary and an other amount, and the initiating of an initial transaction request and sending of a corresponding transaction message comprises:
receiving, at the first personal portable electronic device of the debtor, data linked to the one of said monetary and said other amount;
receiving a command to accept said transfer;
authenticating said acceptance command; and
upon said authenticating of said acceptance command being successful, sending securely the corresponding transaction message,
including said data, directly to the second personal portable electronic device of the creditor of said transfer via the near-field wireless communication modules of the first and the second personal portable electronic devices.

20. The transaction message system according to claim 19, wherein the second personal portable electronic device is operationally configured to, after receiving a confirmation of transaction of the debtor transmitted from the first portable electronic device to the second personal portable electronic device via the near-field wireless communication modules, send a transaction request to a computer system of one of a banking establishment, a trusted third party, and a person responsible for managing the values concerned.

21. The transaction message system according to claim 20, wherein the transaction request to the computer system is transmitted via a data communication network.

22. The transaction message system according to claim 18, wherein the second personal portable electronic device is configured to allow the creditor to initiate transfer of one of a monetary and an other amount.

23. The transaction message system according to claim 22, wherein the first personal portable electronic device is configured to, after receiving a confirmation of transaction of the creditor transmitted from the second portable electronic device to the first personal portable electronic device via the near-field wireless communication modules, send a transaction request to one of a computer system of a banking establishment, a trusted third party, or a person responsible for managing the values concerned.

24. The transaction message system according to claim 23, wherein the transaction request to the computer system is transmitted via a data communication network.

25. The transaction message system according to claim 22, wherein the second portable electronic device sends an official banking ID to the first portable electronic device via the near-field wireless communication modules.

* * * * *